United States Patent [19]

Takahashi

[11] Patent Number: 4,953,941
[45] Date of Patent: Sep. 4, 1990

[54] OPTICAL FIBER CONNECTING DEVICE

[75] Inventor: Mitsuo Takahashi, Matsudo, Japan

[73] Assignee: Seikoh Giken Co., Ltd., Chiba, Japan

[21] Appl. No.: 274,184

[22] Filed: Nov. 21, 1988

[51] Int. Cl.[5] .............................................. G02B 6/36
[52] U.S. Cl. ............................ 350/96.20; 350/96.21
[58] Field of Search ............................ 350/96.20, 96.21

[56] References Cited

U.S. PATENT DOCUMENTS

| | | | |
|---|---|---|---|
| 4,699,458 | 10/1987 | Ohtsuki et al. | 350/96.21 |
| 4,723,830 | 2/1988 | Messbauer | 350/96.20 |
| 4,738,507 | 4/1988 | Palmquist | 350/96.21 |
| 4,738,508 | 4/1988 | Palmquist | 350/96.21 |
| 4,747,659 | 5/1988 | Takahashi | 350/96.21 |
| 4,753,510 | 6/1988 | Sezerman | 350/96.21 |
| 4,792,206 | 12/1988 | Skuratovsky | 350/96.21 |
| 4,798,442 | 1/1989 | Feilhauer et al. | 350/96.21 |

*Primary Examiner*—Frank Gonzalez
*Attorney, Agent, or Firm*—Spencer & Frank

[57] ABSTRACT

An optical fiber connecting device in which a pair of ferrules holding optical fibers in their central holes and opposing at their end faces are inserted in a through bore of an aligning sleeve having a structure that enables the angles of the ferrules' end faces at which they contact each other to be adjusted by rotating both or either of the ferrules, and enables the adjusted positions to be fixed. A pair of optical connector plug assemblies each include a ferrule having an optical fiber-holding central hole and a threaded portion formed at one end of its outer-diameter portion, a cylindrical position-determining ring having a threaded hole rotatably engageable with the threaded portion and a position-determining key provided on its outer-diameter portion, and a ferrule-urging compression coil spring and a threaded-hole-provided engagement nut which are slidably fitted around the outer-diameter portion of the ferrule. An aligning sleeve has keyways formed at either end of its outer-diameter portion and is adapted to receive the position-determining keys, threaded portions formed at either end of the sleeve's outer-diameter portion and adapted to engage with the plug assemblies, and an aligning through bore formed in the central portion of the sleeve to allow the ferrules' leading end portions to be inserted therein from either ends and to oppose each other.

6 Claims, 3 Drawing Sheets

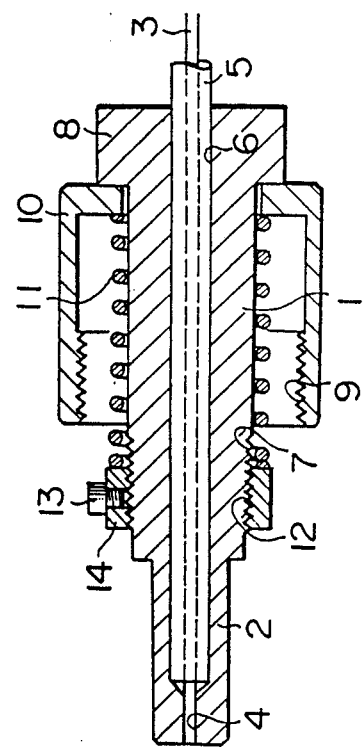
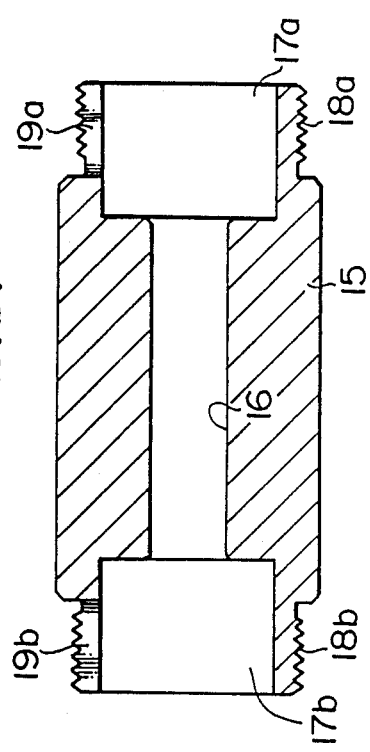
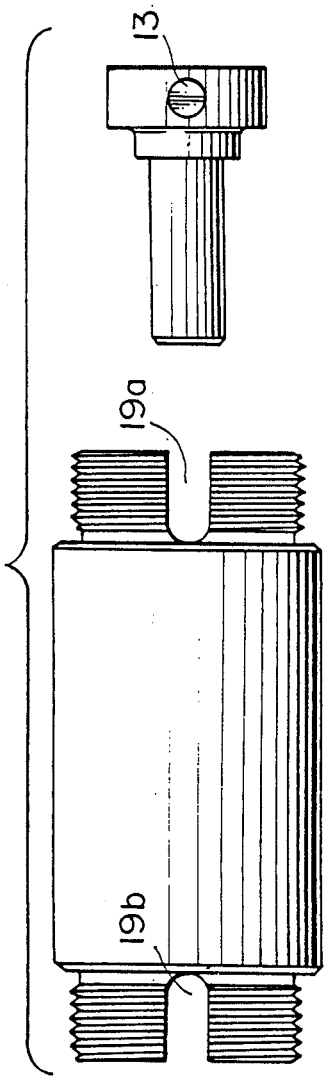

OPTICAL FIBER CONNECTING DEVICE

BACKGROUND OF THE INVENTION

The present invention relates to an optical fiber connecting device for connecting optical fibers and, more particularly, to a structure of such a device that is simple yet capable of achieving great reduction in the insertion loss incurred in connectors connecting single-mode optical fibers used in long-distance large-capacity communications.

Optical fiber cores which are used in single-mode optical fibers to transmit optical signals have, in general, a diameter of 7 to 10 μm in order to reduce transmission loss. The insertion loss incurred by connecting optical fibers by means of optical connectors is influenced by various factors. It is known that the greatest of these factors is the deviation of the axial centers of optical fiber cores which oppose each other and are connected to each other. It is said that if, for instance, the diameter of an optical fiber core is 10 μm, a deviation of 1 μm of the axial center causes an insertion loss of about 0.25 dB; similarly, an axial-center deviation of 2 μm causes an insertion loss of about 0.75 dB, and an axial-center deviation of 3 μm causes an insertion loss of about 1.8 dB. It is desired that the insertion loss should be within a range in which the maximum is 0.5 dB and which averages 0.2 dB. In order that the insertion loss be within this range, the deviation of the axial center of an optical fiber core must be within a range in which the maximum is 1.6 μm and which averages 0.9 μm. Actually, however, the deviation of the axial center of an optical fiber core relative to the center of the outer diameter of the ferrule is influenced by other factors, such as errors incurred during the production of the optical fibers per se and the ferrules, as well as fitting errors incurred during the assembly of the optical fibers onto the ferrules. As a result, the axial-center deviation amounts to about 3 to 4 μm at most and averages about 1.5 μm, making it impossible, at present, to achieve an insertion loss within the desired range.

Hitherto, various methods have been proposed based on the fact that, in most of the optical fiber connectors combined with optical fibers, the cumulative influence of inevitable errors such as those described above causes a phenomenon in which the axial center of each optical fiber core is more or less eccentric with respect to the outer-diameter center of the ferrule. These methods are adapted to equalize the angles at the maximum eccentric positions of the axial centers of the optical fiber cores with respect to the outer-diameter centers of the ferrules of a pair of optical connectors, thereby minimizing the axial-center deviations of the optical fiber cores. However, these methods are not effective enough because they encounter technical difficulties concerning the production of optical connectors or because they are limited to adjustment in several stages.

SUMMARY OF THE INVENTION

An object of the present invention is to provide an optical fiber connecting device which is capable of achieving a great reduction in the insertion loss with a simple structure.

According to one aspect of the present invention, there is provided an optical connector plug device comprising: a pair of optical connector plug assemblies each including a ferrule member having a central hole through which an optical fiber is inserted to be held therein and a threaded portion formed at one end of the outer-diameter portion of the ferrule member, a cylindrical position-determining movable ring having a threaded hole rotatably engageable with the threaded portion of the ferrule member and a position-determining key provided on the outer-diameter portion of the ring, and a ferrule member-urging compression coil spring and an engagement nut formed with a threaded hole which are slidably fitted around the outer-diameter portion of the ferrule member.

According to another aspect of the present invention, there is provided an aligning sleeve for an optical connector plug device having ferrule members, position-determining movable rings, and engagement nuts, comprising: keyways formed at either end of the outer-diameter portion of the sleeve and adapted to receive position-determining keys of the position-determining movable rings; threaded portions formed at either end of the outer-diameter portion of the sleeve and adapted to engage with the engagement nuts; and a through bore formed in the central portion of the sleeve to allow the leading end portions of the ferrule members to be inserted into the through bore from either ends of the sleeve and brought into opposing relationship.

The structure according to the present invention enables the angles at the maximum eccentric positions of the axial centers of the optical fiber cores connected by a pair of optical connector plug assemblies to be subjected to rotary adjustment in a stageless manner using, as a reference, the position-determining keys received in the keyways of the aligning sleeve. By virtue of this structure, therefore, the amount of deviation of the axial centers of the pair of connected optical fiber cores can be accurately reduced to an amount exactly equal to the difference between the absolute values of the eccentricities of the optical fiber cores with respect to the centers of the outer diameters of the corresponding ferrule members, that is to the minimum deviation of axes.

Further, the position-determining keys can be rigidly fixed to the ferrule members after adjustment. Therefore, even repeated assembly and disassembly of the plug device cause no change in the adjusted angles, making it unnecessary to adjust the angles each time.

The optical connector plug device comprising the above-stated members is assembled in the following manner.

An engagement nut, then a ferrule member-urging coil spring are fitted around the outer-diameter portion of one ferrule member holding a first optical fiber to be connected. Subsequently, a position-determining ring is threaded onto the threaded portion at one end of the ferrule member, thereby completing a first plug assembly. The position-determining ring is fixed to the ferrule member in the following manner: after the ring has been threaded to a position which is about 2 mm inside of the end face of the threaded portion, a small amount of an epoxy adhesive is coated on the tip portion of the threaded portion, which is followed by returning the position-determining ring to the initial position. A second plug assembly is completed in the same manner.

The pair of plug assemblies may be mounted onto the aligning sleeve. The assembly is performed in the following manner.

The leading end portion of the first plug assembly is inserted into the aligning bore of the aligning sleeve, and the corresponding engagement nut is threaded onto the threaded portion provided in the outer-diameter portion of the aligning sleeve, thereby completing the mounting of the first plug assembly. The second plug assembly is mounted onto the aligning sleeve in the same manner except that the engagement nut of the second assembly is left unengaged.

With this condition, when the second plug assembly is pushed toward the center of the aligning sleeve, the leading ends of the ferrule members of the plug assemblies are brought into close contact with each other in which they press against each other. By this operation, the faces of optical fibers that are at the leading ends of the ferrule members are simultaneously brought into close contact and connected with each other.

At this time, an optical connector at the other end of the first optical fiber held by the first plug assembly is connected to a light source, while an optical connector at the other end of a second optical fiber held by the second plug assembly is connected to an optical power meter, and, while the insertion loss is being measured, the ferrule member of the second plug assembly is rotated in a stageless manner till the reading reaches the optimum value. By this operation, the angle at the maximum eccentric position of the axial center of the second optical fiber core with respect to the outer-diameter center of the ferrule member of the second plug assembly can be accurately equalized with the angle at the maximum eccentric position of the axial center of the first optical fiber core with respect to the outer-diameter center of the ferrule member of the first plug assembly, with the position determining keys received in the keyways of the aligning sleeve serving as a reference.

After adjustment, the position-determining rings can be rigidly fixed to the threaded portions of the ferrule members by means of an epoxy adhesive which has previously been applied to the threaded portions and which is cured by being heated or is allowed to cure. Therefore, even repeated assembly and disassembly of the optical connector plug device cause no change in the adjusted angles, requiring no adjustment each time.

BRIEF DESCRIPTION OF THE DRAWINGS

FIGS. 2(a), (b) and (c) are views of one plug assembly of an optical connector plug device and an aligning sleeve of the present invention, FIG. 2 (a) being a sectional view of the plug assembly, FIG. 2 (b) being a sectional view of the aligning sleeve, and FIG. 2 (c) being a schematic plan view of the sleeve and a partial view of the plug assembly.

DETAILED DESCRIPTION OF THE PREFERRED EMBODIMENTS

Figure 1:
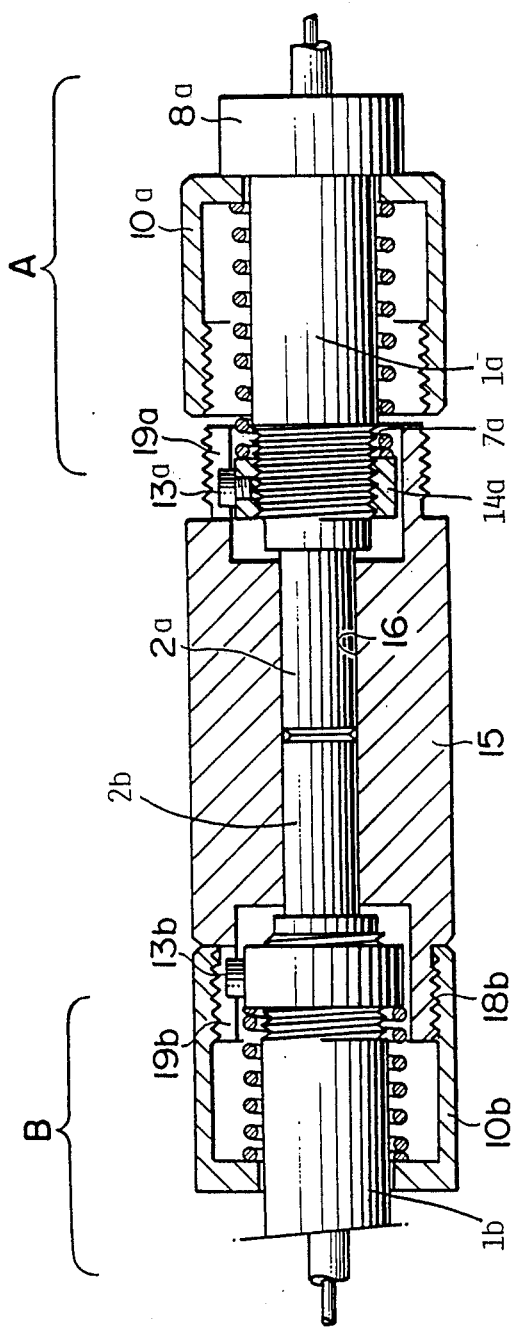
FIG. 1 is a sectional view showing a state in which optical fibers are connected by means of an optical fiber connecting device of the present invention.

Referring to FIGS. 2 (a) to 2 (c), the construction of an optical connector plug device and an aligning sleeve in accordance with the present invention will be described.

The optical connector plug device has a pair of plug assemblies, each being such as that shown in FIG. 2 (a). Each plug assembly includes a generally cylindrical ferrule member 1. The ferrule member 1 has a ferrule portion 2 formed at one end of the member 1 and capable of being inserted into the bore of an aligning sleeve, a micro-hole 4 which is formed at the center of the member 1 and through which an optical fiber 3 is inserted, a stepped hole 6 which is also formed at the center of the member 1 and into which a protective coating 5 of the optical fiber 3 is inserted, a threaded portion 7 formed on the outer-diameter side of the member 1 at a position close to the one end thereof, and a flange portion 8 also formed on the outer-diameter side of the member 1 at the other end thereof. Each plug assembly further includes an engagement nut 10 having a threaded hole 9 formed at one end thereof and capable of engaging with the aligning sleeve, a compression coil spring 11 for urging the ferrule member 1, and a position-determining ring 14 formed with a threaded hole 12 and provided with a position-determining key 13 on the outer-diameter surface thereof. Each plug assembly is formed by assembling the above-described members.

The assembling is performed in the following manner. A tip portion of the protective coating 5 is removed to expose a part of the optical fiber 3. The thus prepared optical fiber 3 is fixed in place in the micro-hole 4 and the stepped hole 6 by means of an adhesive, which is followed by finishing the exposed end face of the optical fiber 3 by polishing it. Subsequently, the engagement nut 10, then the compression coil spring 11 are fitted around the outer-diameter portion of the ferrule member 1. Finally, the position-determining ring 14 is threaded onto the threaded portion 7 of the ferrule member 1, thereby completing the plug assembly. To fix the position-determining ring 14 to the threaded portion 7 of the ferrule member 1, the ring 14 is first threaded onto the threaded portion 7 to a position which is about 2 mm inside the end face of the portion 7, then an epoxy adhesive is thinly coated on the exposed part of the threaded portion 7, and, finally, the position-determining ring 14 is returned, whereby the epoxy adhesive fills the engaging threaded portions, making it possible to rigidly fix the position-determining ring 14.

Referring to FIG. 2 (b), an aligning sleeve 15 comprises a through bore 16 which is formed at the center of the sleeve 15 and into which the outer-diameter portions of the ferrule portions 2 can be snugly inserted, stepped holes 17a and 17b which are formed at either end of the sleeve 15 and into which the position-determining rings 14 can be inserted, threaded portions 18a and 18b formed at either end of the outer-diameter portion of the sleeve 15 and engageable with the engagement nuts 10, and keyways 19a and 19b also formed at either end of the outer-diameter portion of the sleeve 15 and capable of receiving the position-determining keys 13.

FIG. 1 shows a condition in which the optical connector plug assemblies of the present invention are mounted onto the aligning sleeve of the present invention to connect optical fibers. To achieve this condition, in the first place, a first plug assembly B holding a first optical fiber (only part of which is shown) is mounted onto the aligning sleeve 15 by threading the engagement nut 10b onto the threaded portion 18b of the aligning sleeve 15 while the position-determining key 13b of the plug assembly is being inserted into the keyway 19b of the sleeve 15.

At this time, if it is required to adjust the axial centers of the optical fiber cores, the following operation is performed. An optical connector B' (not shown) at the other end of the first optical fiber held by the plug assembly B is connected to a light source, and an optical connector A' (not shown) at the other end of a second optical fiber held by the other plug assembly A is connected to an optical power meter. Thereafter, as shown in FIG. 1, only the position-determining key 13a and the ferrule portion 2a of the plug assembly A are respectively inserted into the keyway 19a and the through bore 16 of the aligning sleeve 15, while the engagement nut 10a remains separate from the sleeve 15. With the leading ends of the ferrule members 1a and 1b being kept in light contact with each other, the flange portion 8a of the ferrule member 1a is carefully rotated in either of two directions till the reading shown by the optical power meter reaches the optimum value.

When the optimum value is reached, the plug assembly A is taken out from the aligning sleeve 15 while it maintains its angle corresponding to the optimum value. Subsequently, an epoxy adhesive which has been applied to the portion of threaded engagement between the position-determining ring 14a and the portion 7a of the ferrule member 1a is dried to set. The above-described adjustment enables the insertion loss incurred between the optical connector plug assemblies A and B to be minimized without difficulty.

Next, referring to FIGS. 3 (a) and (b), the principles of adjusting the axial centers of the optical fiber cores will be explained.

Figure 3A:
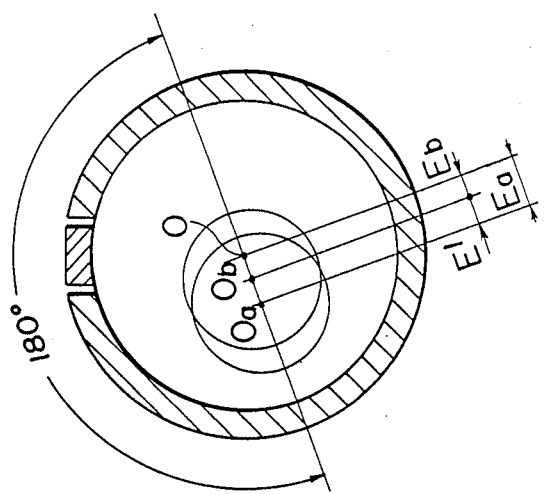
FIGS. 3 (a) and 3 (b) are views used to explain the principles of adjusting the axial centers of the optical fiber cores.
Figure 3B:
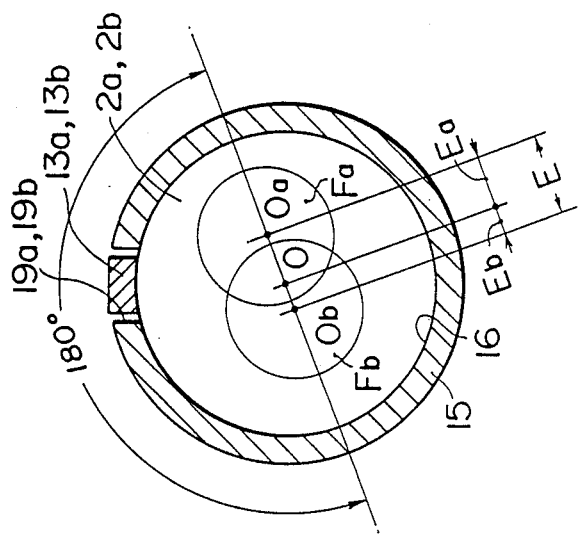

FIG. 3 (a) shows the state before adjustment, in which the deviation of the axial centers of the optical fiber cores is at the maximum. The ferrule portions 2a and 2b are snugly inserted in the through bore 16 of the aligning sleeve 15. The position-determining keys 13a and 13b corresponding to the ferrule portions 2a and 2b are respectively received in the keyways 19a and 19b provided in the aligning sleeve 15. It is assumed that the through bore 16 has an axial center O, while the axial center Oa of one optical fiber core Fa held in the ferrule portion 2a is eccentric with respect to the center O by an amount Ea, and the axial center Ob of the other optical fiber core Fb held in the ferrule portion 2b is eccentric with respect to the center O by an amount Eb. If it is simultaneously assumed that the axial centers Oa and Ob are an angle of 180° apart from each other, it would be clearly seen that the amount E of deviation of the axial centers Oa and Ob is expressed as $E=Ea+Eb$ and hence is at the maximum.

FIG. 3 (b) shows the state after adjustment. Specifically, the ferrule member 1a has been rotated through 180° in either of two directions in the adjustment, so that the amount E' of deviation of the axial centers Oa and Ob is expressed as $E'=|Ea-Eb|$ and hence is at the minimum.

The use of the structure in accordance with the present invention is not limited to mere improvement in the insertion loss performance. For instance, if the optical fibers to be connected are of a special type, such as constant polarization wave optical fibers in which optical signals are transmitted only through the cross-sections of the optical fibers that are at a certain fixed angle, it is required that the angular phases of the connecting faces of the optical connectors should be accurately equalized. In such a case, with the structure of the present invention, the angular phases can be adjusted in a stagelessly continuous manner and then be fixed at the adjusted angles, without difficulty. Further, the adjusted positions will not be changed even by repeated assembly and disassembly, thereby enabling stable recovery of the adjusted positions after reassembly.

What is claimed is:

1. An optical fiber connecting device comprising a pair of optical connector plug assemblies and an aligning sleeve, each of said pair of optical connector plug assemblies including:
   a ferrule member having a central hole for receiving and holding an optical fiber, said ferrule member including a threaded portion formed on an outer-diameter portion thereof adjacent one end;
   a cylindrical position-determining movable ring slidably fitted around the outer-diameter portion of said ferrule member and having an internally threaded through-hole rotatably engaged with the threaded portion of said ferrule member, said cylindrical position-determining movable ring further having a position-determining key on an outer-diameter portion of said ring;
   a ferrule member-urging compression coil spring; and
   an engagement nut formed with an internally threaded hole, said coil spring and engagement nut being slidably fitted around the outer-diameter portion of said ferrule member.

2. An optical fiber connecting device according to claim 1, wherein said aligning sleeve comprises:
   keyways formed at both ends of the outer-diameter portion of said sleeve receiving the position-determining keys of said position-determining movable rings;
   threaded portions formed at either end of the outer-diameter portion of said sleeve engaging said engagement nuts, and
   a through bore formed in the central portion of said sleeve receiving the leading end portions of said ferrule members inserted into said through bore from either ends of said sleeve and brought into opposing relationship, either or both of said ferrule members being rotatable relative to said position-determining keys to enable individual adjustment of the angular phases at which said ferrule members contact each other.

3. An optical fiber connecting device according to claim 1, wherein the surface of said threaded hole of said position-determining movable ring and the surface of said threaded portion in the outer-diameter portion of said ferrule member are fixed to each other by means of an adhesive.

4. An optical fiber connecting device comprising a pair of optical connector plug assemblies and an aligning sleeve, each of said optical connector plug assemblies including:
   a ferrule member having a ferrule portion at one end, a flange portion at the other end and a threaded outer-diameter portion located between said ferrule and flange portions, said ferrule member having a central aperture for receiving and holding therein an optical fiber;
   a cylindrical position-determining ring having a threaded through-hole therein and an outer-diameter surface provided with a position-determining key, the threaded through-hole of said position-determining ring being rotatably engaged with the threaded outer-diameter portion of said ferrule member;
   an engagement nut having a threaded hole at one end for engagement with said aligning sleeve, said engagement nut being slidably fitted around the outer-diameter portion of said ferrule member and positioned between the flange portion of said ferrule member and said position-determining ring; and a compression coil spring interposed between said engagement nut and the outer-diameter portion of said ferrule member, said compression coil spring urging said engagement nut against the flange of said ferrule member.

5. An optical fiber connecting device according to claim 4 wherein said aligning sleeve has threaded portions at opposite ends, keyways formed in said threaded portions and a through-bore formed in the central portion thereof, said through-bore receiving the ferrule portions of ferrule members inserted in opposite ends of said aligning sleeve so that said ferrule members are positioned in an opposing relationship within said through-bore, the threaded ends of said aligning sleeve being engagable with the threaded holes of said engagement nuts and said keyways receiving said position-determining keys, said ferrule members being rotatable with respect to said position-determining keys to enable individual adjustment of the relative angular positions of said ferrule members.

6. A method of connecting first and second optical fibers so as to reduce insertion loss, comprising the steps of:

inserting said first and second optical fibers into central apertures in first and second ferrule members, each of said ferrule member having a ferrule portion at one end, a flange portion at the other end and a threaded outer diameter portion between said ferrule and flange portions;

fitting an engagement nut, having a threaded end, and a coil spring around the outer diameters of each of said ferrule member;

threading a position-determining ring onto the threaded outer diameter portion of each of said ferrule members, said position-determining ring having an outer-diameter surface provided with a position-determining key;

inserting the ferrule portions of said first and second ferrule members into opposite ends of an aligning bore of an aligning sleeve so that the ends of said ferrule portions contact each other, said aligning sleeve being threaded at each end and having keyways formed therein for receiving the position-determining keys of said position-determining rings;

threading the threaded end of the engagement nut on said first ferrule member on to the threads at one end of said aligning sleeve;

connecting a light source to an end of said first optical fiber and an optical power meter to an end of said second optical fiber;

rotating the flange portion of said second ferrule member until said power meter reads an optimum value;

removing said second ferrule member and associated engagement nut, coil spring and position-determining ring from said aligning sleeve; and fixing the position-determining ring on said second ferrule member to said second ferrule member.

* * * * *